(12) United States Patent
Bae et al.

(10) Patent No.: US 7,242,975 B2
(45) Date of Patent: Jul. 10, 2007

(54) HINGE DEVICE FOR PORTABLE TERMINAL USING THE SAME

(75) Inventors: Jong-Gun Bae, Kumi-shi (KR); Sung-Sun Park, Kumi-shi (KR)

(73) Assignee: Samsung Electronics Co., Ltd. (KR)

( * ) Notice: Subject to any disclaimer, the term of this patent is extended or adjusted under 35 U.S.C. 154(b) by 568 days.

(21) Appl. No.: 10/287,171

(22) Filed: Nov. 4, 2002

(65) Prior Publication Data

US 2003/0162509 A1 Aug. 28, 2003

(30) Foreign Application Priority Data

Feb. 28, 2002 (KR) ................................ 2002-10926

(51) Int. Cl.
*H04M 1/00* (2006.01)
*H04B 1/38* (2006.01)
*E05F 1/08* (2006.01)

(52) U.S. Cl. ................ 455/575.3; 455/575.1; 455/550.1; 455/90.1; 455/90.3; 379/433.13; 16/303; 16/304

(58) Field of Classification Search ............. 455/575.3, 455/90.1, 90.3, 575.1, 550.1; 379/433.11, 379/433.13, 428.01, 433.01; 16/285, 303, 16/304
See application file for complete search history.

(56) References Cited

U.S. PATENT DOCUMENTS 6,459,887 B2 * 10/2002 Okuda ........................ 455/90.1
6,628,974 B1 * 9/2003 Lim ......................... 455/575.3
6,678,539 B1 * 1/2004 Lu ........................... 455/575.1

\* cited by examiner

*Primary Examiner*—Matthew Anderson
*Assistant Examiner*—Eugene Yun
(74) *Attorney, Agent, or Firm*—The Farrell Law Firm (57) ABSTRACT

A hinge device of a portable terminal couples a body and a folder of the portable terminal and enables rotation of the folder with respect to the body. The hinge device includes a cylindrical hinge housing having an open end, a closed end, and a suspending block that projects from a peripheral surface of the cylindrical hinge housing and extends longitudinally between the open end and the closed end; a hinge shaft having a disk and an angular block projecting from the disk, disposed along a hinge axis, the disk being housed in the cylindrical hinge housing and the angular block protruding through the open end of the cylindrical hinge housing; a hinge cam, disposed outside the cylindrical hinge housing, having a concave block disposed along the hinge axis in opposition to the angular block of the hinge shaft, to engage in a sliding motion in conjunction with the angular block; and a conical compression coil spring, disposed between the closed end of the cylindrical hinge housing and the disk of the hinge shaft, to press the hinge shaft against the hinge cam. The conical compression coil spring is compressible into a plane, so that the space required for installing and assembling the hinge device in the portable terminal can be reduced. When the hinge housing is combined with the folder of a foldable terminal, the hinge cam is combined with the body of the foldable terminal. Combining the hinge housing with the folder and the hinge cam with the body obviates the need for an axis of a conventional hinge cam, which combines the hinge device with the body, thus enabling the miniaturization of the hinge device and a portable terminal using the same.

10 Claims, 11 Drawing Sheets

HINGE DEVICE FOR PORTABLE TERMINAL USING THE SAME

PRIORITY

This application claims priority to an application entitled "Hinge Device and Portable Terminal Therewith" filed in the Korean Industrial Property Office on Feb. 28, 2002 and assigned Ser. No. 2002-0010926, the contents of which are hereby incorporated by reference.

BACKGROUND OF THE INVENTION

1. Field of the Invention

The present invention relates generally to portable terminals such as cellular telephones, PCS (personal communication service) telephones, or PDA (personal digital assistant) telephones, and in particular, to a hinge device for such a portable terminal.

2. Description of the Related Art

Figure 1:
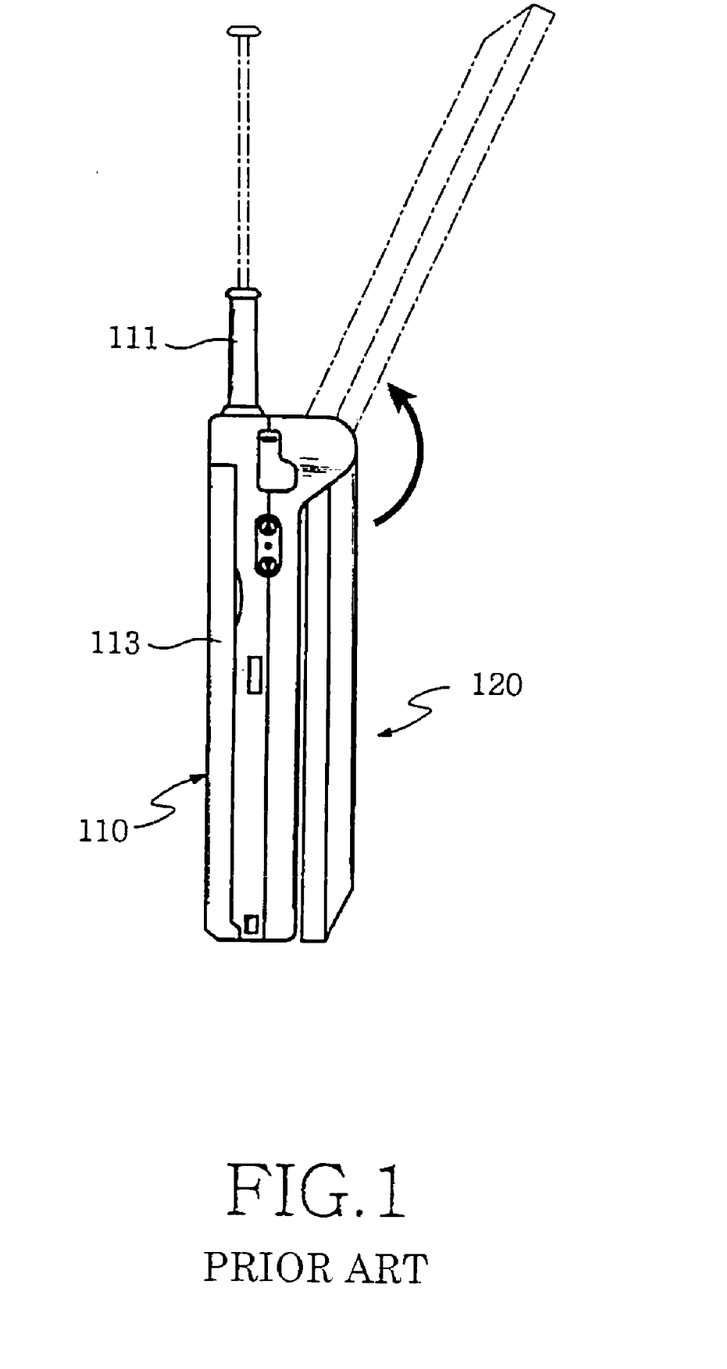
FIG. 1 is a side view of a portable terminal of the known art.

FIG. 1 illustrates a portable terminal 100 according to a known art, showing in particular a foldable terminal. As shown in the drawing, the portable terminal 100 includes a body 110 and a folder 120. The body 110 is provided with an antenna device 111 on the top end and a battery 113 on the rear surface. On the surface facing the folder 120, the body 110 is typically provided with a transmission block (not shown) having a keypad and a microphone. The folder 120 is typically provided with a liquid crystal display (LCD), for displaying terminal status information and related data, and a receiving block (not shown) including a speaker device.

The folder 120 is combined with the body 110 to be rotatable by a hinge device, typically providing approximately 150 degrees of rotation for opening and closing. The same hinge device may be adopted equally to a portable terminal having a flippable or foldable folder.

Figure 2:
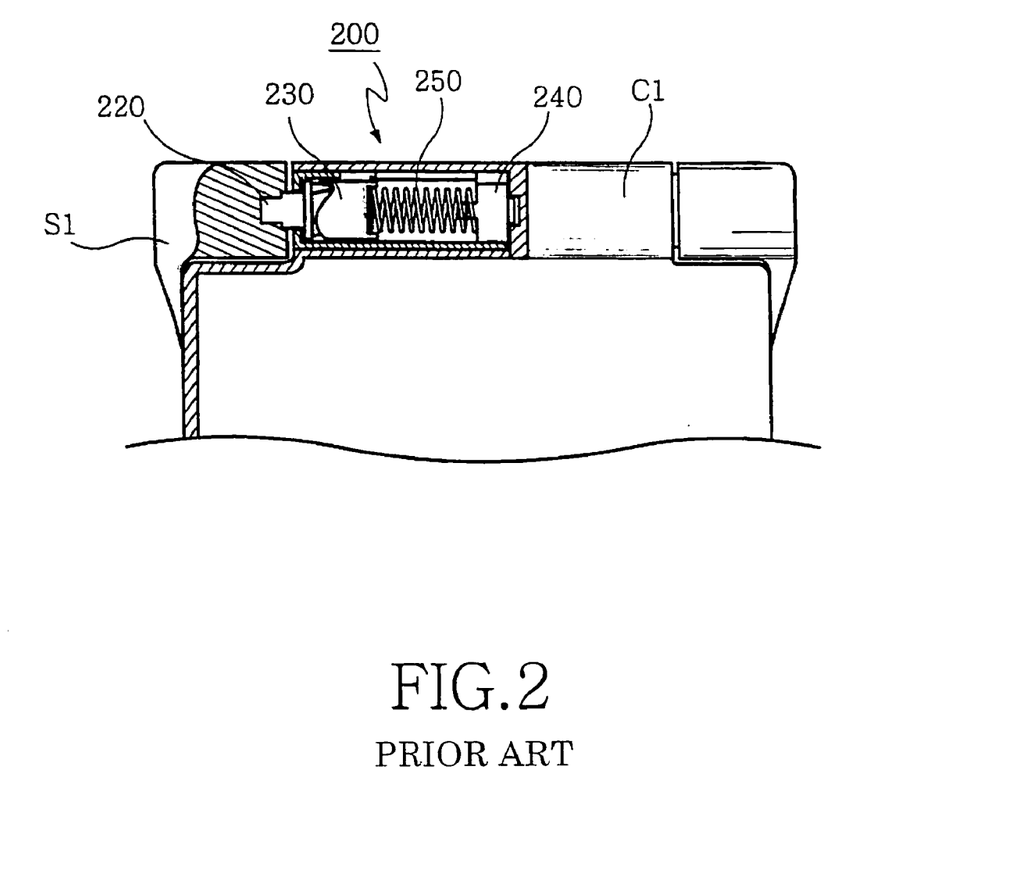
FIG. 2 is a partial cross-sectional cut-away view showing a portion of a portable terminal adopting a conventional hinge device.
Figure 3:
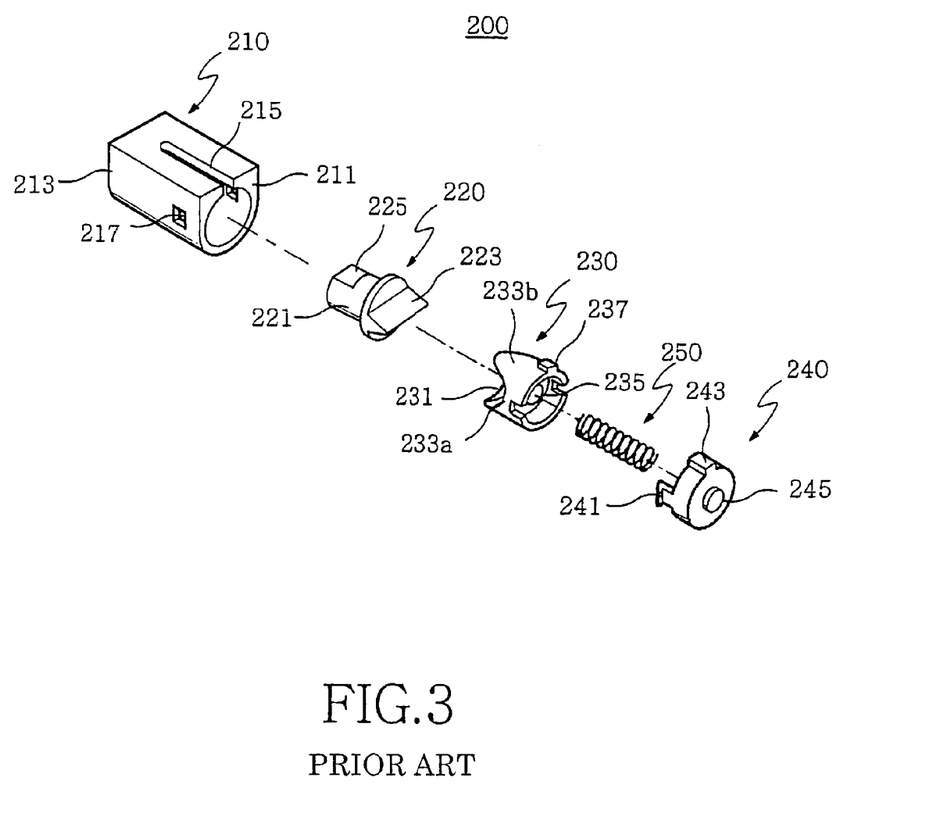
FIG. 3 is a disassembled perspective view of the hinge device of FIG. 2.

FIG. 2 is a partial cross-sectional cut-away view showing a portion of a portable terminal adopting a conventional hinge device 200, and FIG. 3 is a disassembled perspective view of the hinge device 200 shown in FIG. 2. As shown in FIGS. 2 and 3, the hinge device 200 includes a hinge shaft 220 mounted inside a hinge housing 210, a hinge cam 230, a spring cap 240, and a hinge spring 250. The hinge device 200 is housed in a center hinge arm C1. The hinge shaft 220 is combined with a side hinge arm S1 of the body 110.

The hinge device 200 imparts sufficient biasing force to the folder 120 to cause the folder to open automatically, i.e. without applying additional force manually, when the folder is brought to an angle greater than a predetermined angle. At the same time, the hinge device 200 also imparts a biasing force causing the folder to close automatically when the folder is brought to an angle less than the same predetermined angle. This automatic opening and closing is achieved by the operation of the hinge spring 250, which provides the engaging force that causes the surface of an angular block 223 of the hinge shaft 220 to press against the surface of a concave block 231 of the hinge cam 230. Here, the predetermined angle is approximately 35 to 45 degrees.

One side of the hinge housing 210 is a semicircular, curved surface, and the other side is a planar surface, which facilitates assembly. The hinge housing 210 has a first open end 211 for receiving the hinge shaft 220. A guide groove 215 is formed in the planar surface of the hinge housing 210, extending longitudinally from the first open end 211. A pair of suspending grooves 217 are formed on either side of the hinge housing 210.

The hinge shaft 220 has at a D-shaped axis 221 formed at one end, with the angular block 223 being formed at the other. The D-shaped axis 221 has a recessed surface 225 formed on one side. The position of the recessed surface 225 on the D-shaped axis 221 with respect to the orientation of the angular block 223 determines the predetermined (i.e. opening/closing) angle of the folder 120. The axial length of the recessed surface 225 determines insertion depth of the hinge shaft 220 into the side hinge arm S1. The hinge shaft 220 is inserted into the hinge housing 210, with the D-shaped axis 221 projecting through a second open end 213.

The hinge cam 230 engages the angular block 223 of the hinge shaft 220, such that the concave block 231 meets and slides along the surface of the angular block 223. A pair of rises 233a and 233b are formed on either side of the concave block 231. The other end of the hinge cam 230 has a spring-fixing projection 235 and a hinge cam rib 237, which is inserted in the guide groove 215 of the hinge housing 210, enabling a rectilinear motion of the hinge cam 230 along the guide groove 215.

The spring cap 240 includes a pair of suspension jaws 241 to suspend the spring cap 240 in the suspending grooves 217 of the hinge housing 210, a cap rib 243 for inserting in the guide groove 215 of the hinge housing 210, and a fixing projection 245 to fix the spring cap 240 to the center hinge arm C1 of the folder 120.

The hinge spring 250 is installed between the hinge cam 230 and the spring cap 240 for pressing the hinge cam 230 firmly against the hinge shaft 220.

In the conventional hinge device of a portable terminal as described above, the numerous components of the hinge device have limited miniaturization. That is, the hinge shaft, hinge cam, and hinge spring are all housed within the hinge housing, and each component requires a minimum amount of space. Accordingly, further miniaturization of portable terminals adopting such a hinge device is hindered.

SUMMARY OF THE INVENTION

It is therefore an object of the present invention to provide an improved hinge device and a portable terminal using the same, which enables further miniaturization of the portable terminal.

To achieve the above object, there is provided a hinge device of a portable terminal for coupling a body and a folder of the portable terminal and enabling rotation of the folder with respect to the body. The hinge device according to the present invention comprises a cylindrical hinge housing having an open end, a closed end, and a suspending block for mounting that projects from a peripheral surface of the cylindrical hinge housing and extends longitudinally between the open end and the closed end; a hinge shaft having a disk and an angular block projecting from the disk, disposed along a hinge axis, the disk being housed in the cylindrical hinge housing and the angular block protruding through the open end of the cylindrical hinge housing; a hinge cam, disposed outside the cylindrical hinge housing, having a concave block disposed along the hinge axis in opposition to the angular block of the hinge shaft, to engage in a sliding motion in conjunction with the angular block; and a conical compression coil spring, disposed between the closed end of the cylindrical hinge housing and the disk of the hinge shaft, to press the hinge shaft against the hinge cam.

Another aspect of the present invention provides a portable terminal using the above hinge device. The portable terminal according to the present invention comprises a body having a pair of symmetrically arranged side hinge arms; a folder having a center hinge arm disposed between the side hinge arms, the center hinge arm including a cylindrical hinge installing block; and the hinge device.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENTS

The following description references the accompanying drawings and omits well-known functions, details and constructions to avoid obscuring the description of the invention.

Referring to FIGS. 4A–4C and 5, the hinge device according to a preferred embodiment of the present invention includes a hinge housing 410, a hinge shaft 420, a conical compression coil spring 429, a hinge cam 430, and a guide pin 440, all of which are arranged along a hinge axis H1. The hinge housing 410, hinge shaft 420, and conical compression coil spring 429 are housed within the hinge housing 410. The hinge cam 430 is installed opposite the hinge shaft 420 to engage therewith from within the hinge housing 410. The guide pin 440 passes through the hinge cam 430 and the hinge shaft 420, and preferably is fixed on the hinge housing 410.

Figure 4A:
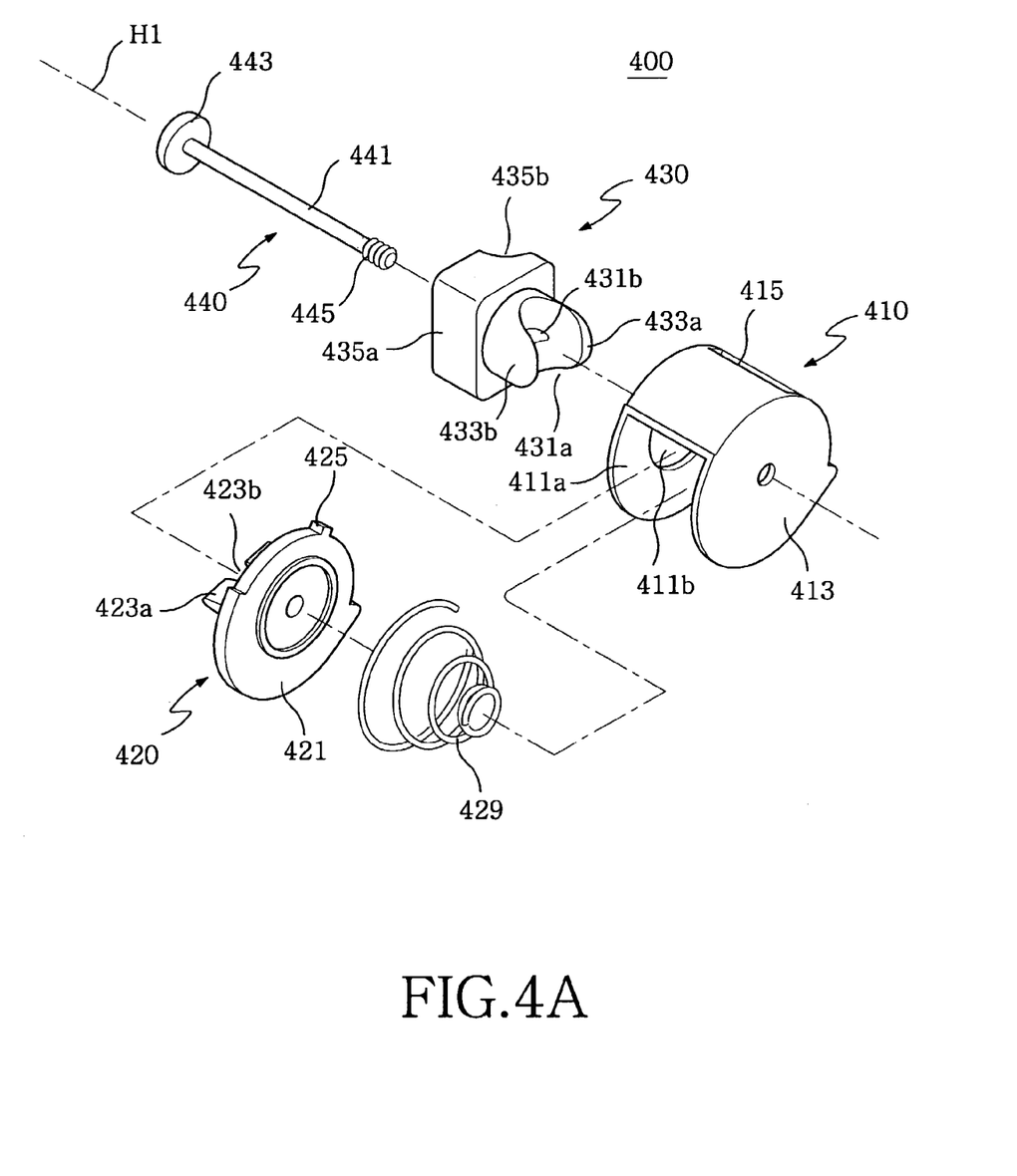
FIG. 4A is a disassembled perspective view of a hinge device in accordance with a preferred embodiment of the present invention.
Figure 4B:
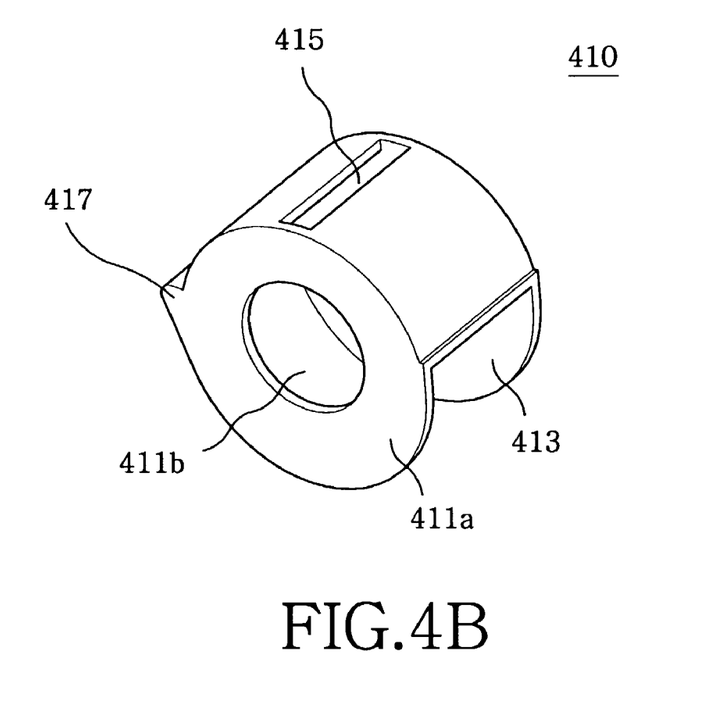
FIG. 4B is a perspective view of the hinge housing of FIG. 4A.

As shown in FIG. 4B, the hinge housing 410 comprises an open end 411a, having an opening 411b formed therein, and a closed end 413. The hinge housing 410 has a basically cylindrical shape, with a portion of its side wall open to facilitate insertion of the hinge shaft 420 and the conical compression coil spring 429. A suspending block 417 (see FIG. 5) is disposed between the open end 411a and the closed end 413, projecting from the a peripheral surface of the hinge housing 410 and extending longitudinally (parallel with the hinge axis H1). The suspending block 417 determines the position and angle of the hinge device 400 when hinge housing 410 is combined with the portable terminal. A guide groove 415 having a predetermined width is formed in the inner side wall of the hinge housing 410 along the longitudinal direction. The guide groove 415 may penetrate the side wall of the hinge housing 410.

Figure 4C:
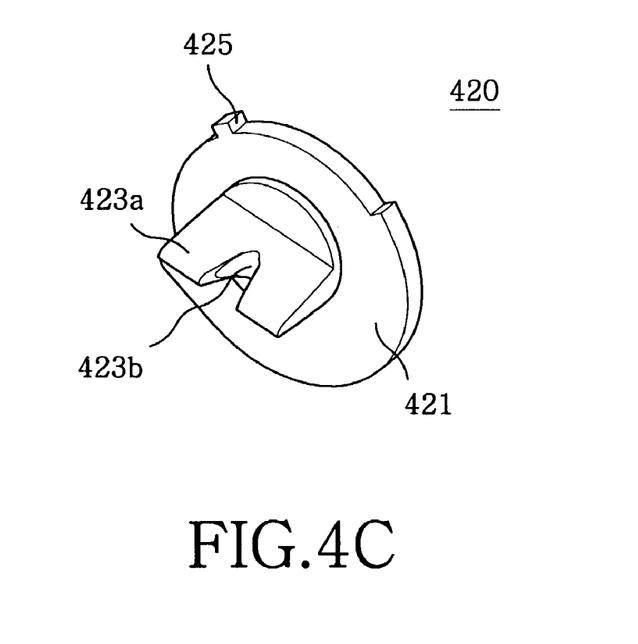
FIG. 4C is a perspective view of the hinge shaft of FIG. 4A.
Figure 5:
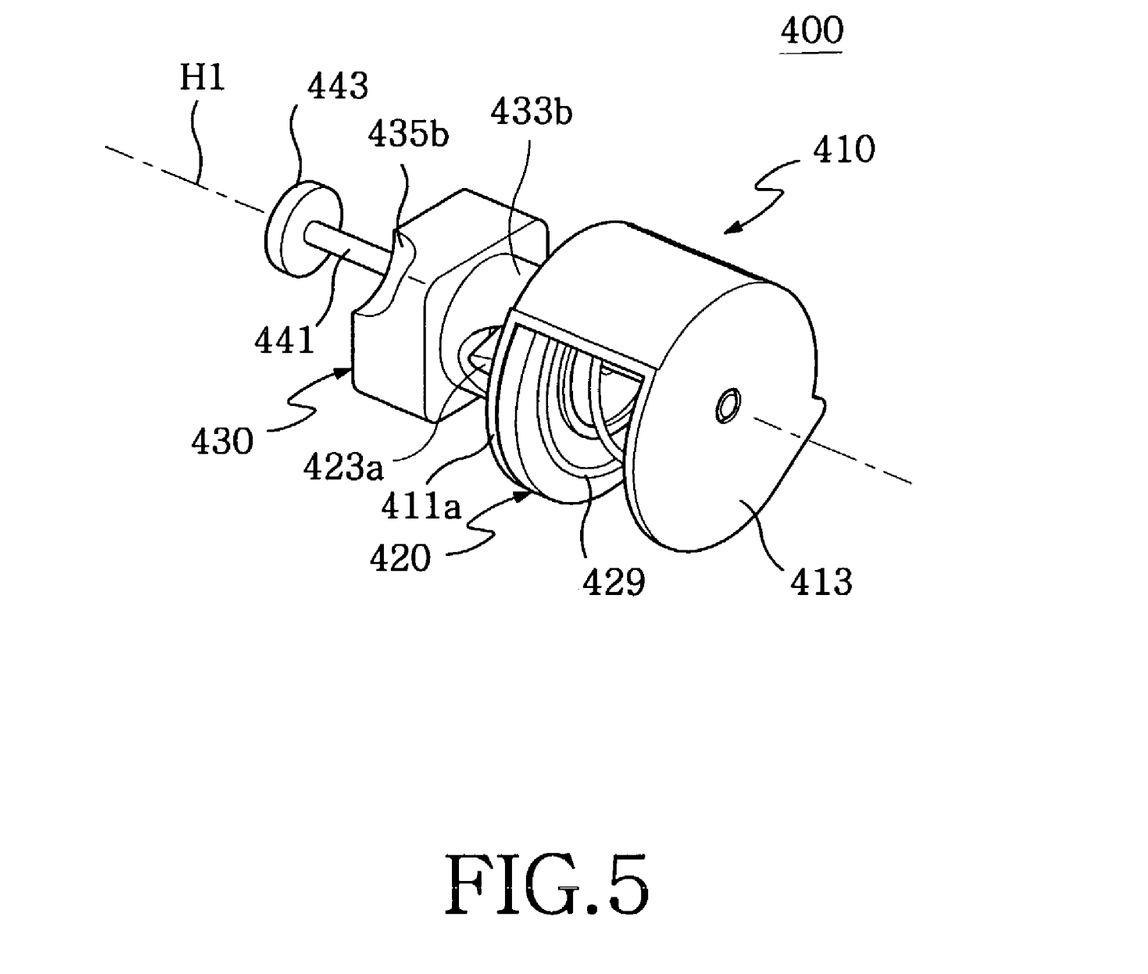
FIG. 5 is an assembled perspective view of the hinge device of FIG. 4A.

As shown in FIG. 4C, the hinge shaft 420 includes an angular block 423a affixed to a disk 421. The angular block 423a has a predetermined height, sufficient to pass through the opening 411b formed in the open end 411a of the hinge housing 410 and to slidably engage the hinge cam 430. A guide projection 425 is formed on the peripheral surface of the disk 421 to correspond to the guide groove 415 of the hinge housing 410, to enable a sliding motion of the hinge shaft 420 along the guide groove. As the guide projection 425 slides along the guide groove 415, the hinge shaft 420 moves rectilinearly, inside the hinge housing 410, over a predetermined range with respect to the open end 411a. This rectilinear motion, as well as the rotary motion of the hinge cam, is stabilized by the guide pin 440, which passes through a hole 423b formed in the hinge shaft 420 at the hinge axis H1.

The conical compression coil spring 429 has a cone shape in which a diameter of the coil becomes gradually smaller, such that the spring can be flattened by applying compressive force. Therefore, the conical compression coil spring 429 is able to reduce the space required to assemble and to package the hinge device, ultimately reducing the length of the hinge housing 410 and the overall size of the hinge device 400.

The hinge shaft 420 and the conical compression coil spring 429 are mounted together within the hinge housing 410. The conical compression coil spring 429 is disposed between the hinge shaft 420 and the closed end 413 of the hinge housing 410 such that the hinge shaft is pressed toward the open end 411a. The action of the conical compression coil spring 429 preferably presses an outer flange of the hinge shaft 420 against an inner wall of the open end 411a of the hinge housing 410, allowing the angular block 423a of the hinge shaft to protrude through the opening 411b.

Formed at one end of the hinge cam 430 is a concave block 431a, corresponding to the angular block 423a of the hinge shaft 420, which is disposed between a pair of rises 433a and 433b formed on either side of the hinge cam. And a coupling groove 435b is formed at the other end of the hinge cam 430. The coupling groove 435b determines the coupling location of the hinge cam 430 when the hinge cam 430 is installed in the body. The hinge cam 430 includes a hinge cam through hole 431b formed at the hinge axis H1 for receiving the guide pin 440. When the hinge cam 430 rotates, the pair of rises 433a and 433b slidable engage and push against the angular block 423a of the hinge shaft 420, forcing the hinge shaft to move rectilinearly within the hinge housing 410. Conversely, the curved surface of the concave block 431a of the hinge cam 430 activates the rotary motion of the hinge cam 430 utilizing the rectilinear motion of the hinge shaft 420. The surface of the angular block 423a of the hinge shaft 420 is shaped to correspond the concave block 431a and to reduce contact friction between the angular block 423a and the concave block 431a.

Accordingly, the hinge cam 430 is disposed outside the hinge housing 410, in opposition to the angular block 423a protruding through the opening 411b. It is important to note that the hinge cam 430 is installed outside rather than inside the hinge housing 410. Therefore, if the hinge housing 410 is installed in the body of a portable terminal, the hinge cam 430 can be installed in the folder, and if the hinge housing is installed in the folder, the hinge cam can be installed in the body. That is, with the hinge cam 430 installed in the body, the hinge cam is actually installed outside the hinge housing 410. Thus, the cross-section of an end 435a of the hinge cam 430 need not be specially shaped (e.g., keyed using a rectangular or D-shaped cross-section) for coupling the hinge cam 430 to the body. Rather, a junction component, which is a component for mating with the hinge cam, can be formed on the body or the folder.

The guide pin 440 in the depicted embodiment is a bolt having attaching means formed at a distal end thereof. In the embodiment, the attaching means is a threaded end 445 formed on a main shaft 441, which passes through the hinge cam 430, hinge shaft 420, and conical compression coil spring 429. The attaching means is secured to the closed end 413 of the hinge housing 410. The guide pin 440 further stabilizes the motion of the hinge shaft 420 and hinge cam 430 and, once secured to the hinge device 400 through the portable terminal's case (i.e. the body or folder) via an anchor portion 443, the guide pin reinforces the overall assembly of the hinge device 400 and the portable terminal.

In the hinge device 400 as described above, when the hinge cam 430 is fastened to the portable terminal's body and the hinge housing 410 is fixed to the folder, as the folder is manually rotated and thus starts to open, the hinge shaft 420 rotates together with the folder, and the pair of rises 433a and 433b of the hinge cam 430 slidably contact and press against the angular block 423a of the hinge shaft 420, thus compressing the conical compression coil spring 429. Continuing the opening operation of the folder, the angular block 423a rides up toward the apexes of the pair of rises 433a and 433b. Then, the moment that the angular block 423a passes the apexes of the pair of rises 433a and 433b, the pressing of the hinge shaft 420 against the hinge cam 430 (using the stored force of the conical compression coil spring 429) allows, even without further opening force being applied to the folder, the folder to keep rotating (opening) and the folder stops when the angular block 423a reaches the nadir of the concave block 431a.

Figure 6:
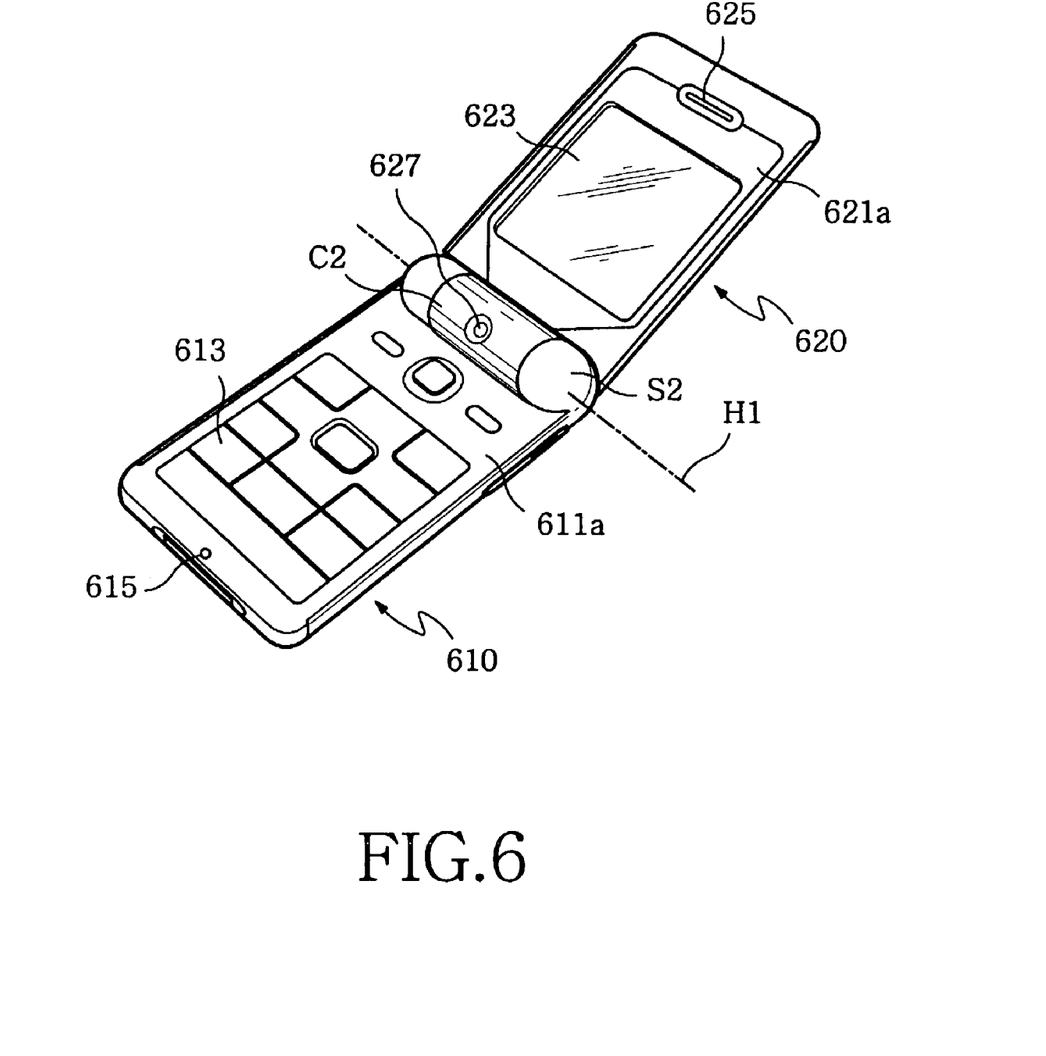
FIG. 6 is a perspective view of a portable terminal adopting the hinge device of FIG. 5 in accordance with a preferred embodiment of the present invention.
Figure 7:
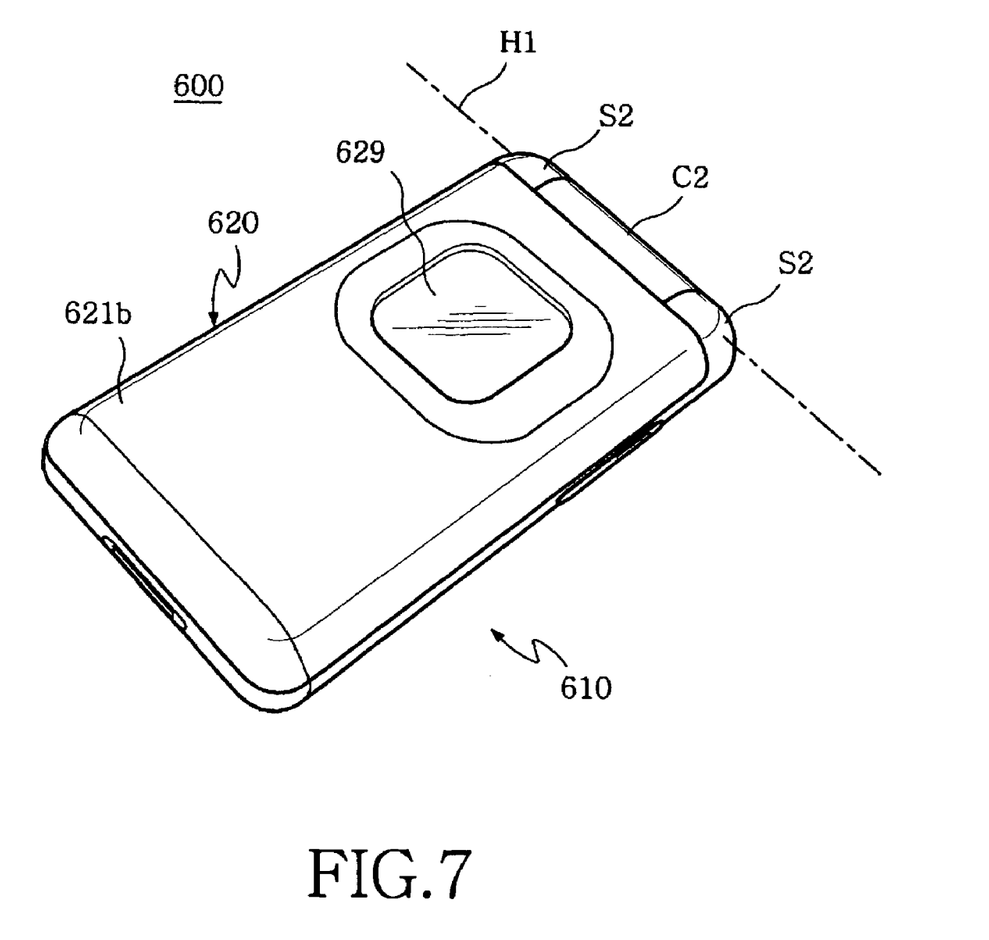
FIG. 7 is a perspective view of the portable terminal of FIG. 6, showing the front side of the portable terminal in a folded state.
Figure 8:
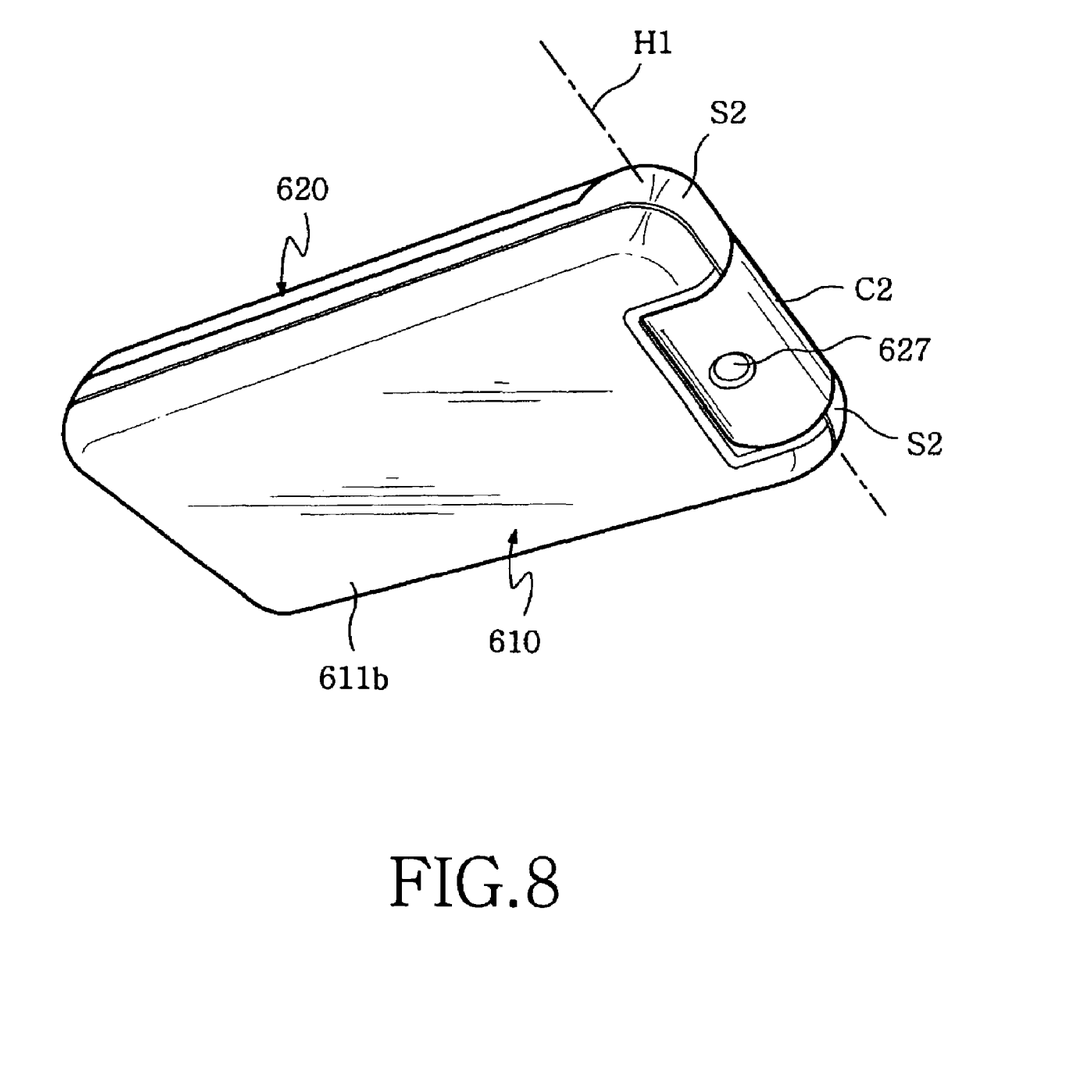
FIG. 8 is a perspective view of the portable terminal of FIG. 6, showing the rear side of the portable terminal in a folded state.

FIGS. 6–8 are perspective views of a portable terminal 600 adopting the hinge device according to the preferred embodiment of the present invention. Here, FIG. 6 shows the portable terminal 600 in an open state, while FIGS. 7 and 8 respectively show front and rear views of the portable terminal in a closed state. The portable terminal 600 is basically comprised of a body 610 and a folder 620.

Referring to the drawings, the body 610 includes a microphone 615 and may comprise a variety of features installed on a top surface 611a, such as a keypad 613. Meanwhile, the folder 620 includes a receiving block and may be similarly endowed with such features as a speaker 625 and a main LCD 623 installed on an inner surface 621a, as well as a slave LCD 629 installed on an outer surface 621b.

A side hinge aim S2 is preferably installed on both sides of the body 610, while a center hinge arm C2 is installed on the folder 620, to be disposed between the side hinge arms of the body. When rotated for opening and closing, the folder 620 travels over a range of approximately 150 degrees with respect to the body 610.

Figure 9:
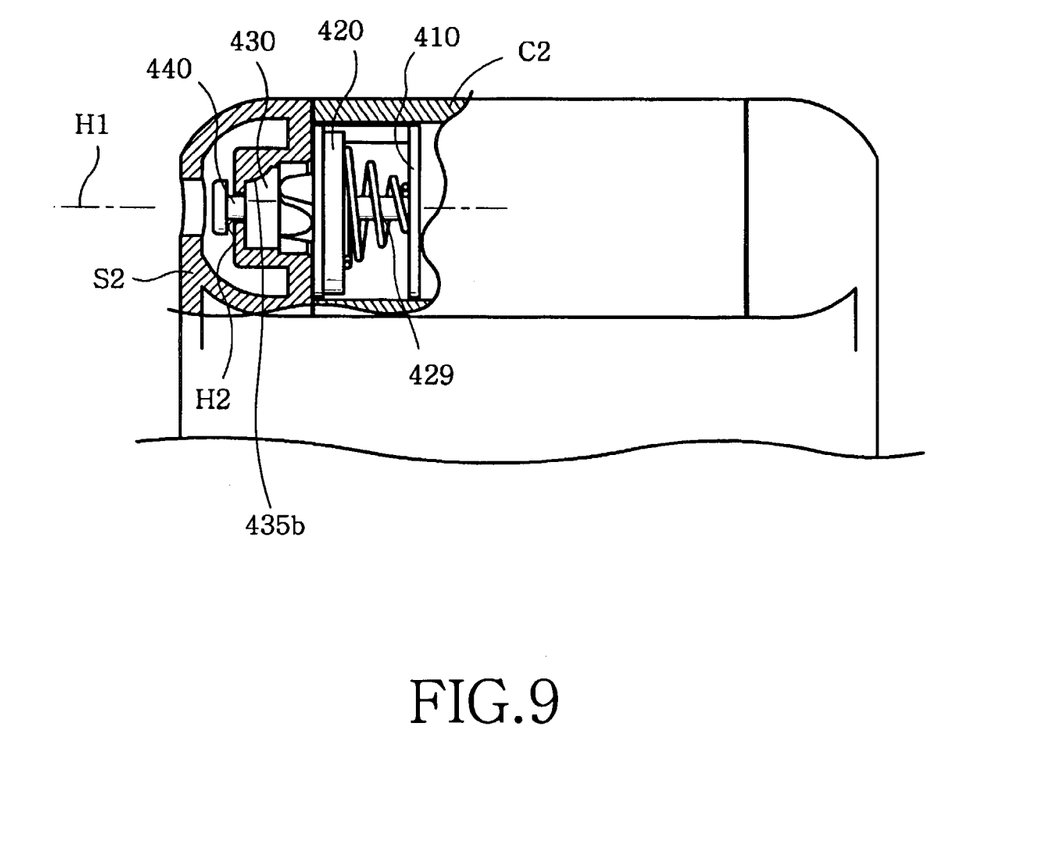
FIG. 9 is a partial cross-sectional, cut-away view of the hinge portion of the portable terminal of FIGS. 6–8.

FIG. 9 is a partial cross-sectional, cut-away view showing the hinge device 400 combined with the portable terminal 600. As shown, the hinge housing 410 is combined with the center hinge arm C2 of the portable terminal folder, and the hinge cam 430 is combined with the side hinge arm S2 of the portable terminal body. Depending on the preferred embodiment, however, the hinge housing 410 could be combined with the side hinge arm S2 of the body, with the hinge cam 430 combined with the center hinge arm C2 of the folder.

As shown in FIG. 9, the hinge device 400 has a structure such that the hinge housing 410, which houses the hinge shaft 420 and the conical compression coil spring 429, is installed in the center hinge arm C2 of the folder 620, and the hinge cam 430 is coupled with the side hinge arm S2 of the body 610. In the conventional hinge device (FIGS. 2 and 3), on the other hand, the hinge shaft 220 and the hinge cam 230 are installed in the hinge housing 210, and the D-shaped axis 221 for coupling the hinge cam to the side hinge arm S1 of the body projects from the hinge shaft 420 to the outside of the hinge housing 210. In the present invention, however, the hinge cam 430 is coupled directly to the side hinge arm S2 of the body 610, thereby reducing the space requirements of the hinge housing 410, and eliminating the need for a specially shaped coupling between the hinge cam 430 and the side hinge arm S2. Instead, the hinge cam 430 is fixed to prevent the rotation of the hinge cam 430 within the side hinge arm S2 of the body 610, while the guide pin 440 is secured to the closed end 413 of the hinge housing 410 to maintain alignment with the hinge axis H1 of the hinge cam 430, passing through an anchor hole H2 formed on the side hinge arm S2 of the body 610, the hinge shaft through hole 423b and hinge cam through hole 431b and the center of the conical compression coil spring 429. This structure results in an overall assembly that is strong, while providing a stabilized motion of the hinge shaft 420 and the hinge cam 430.

Figure 10:
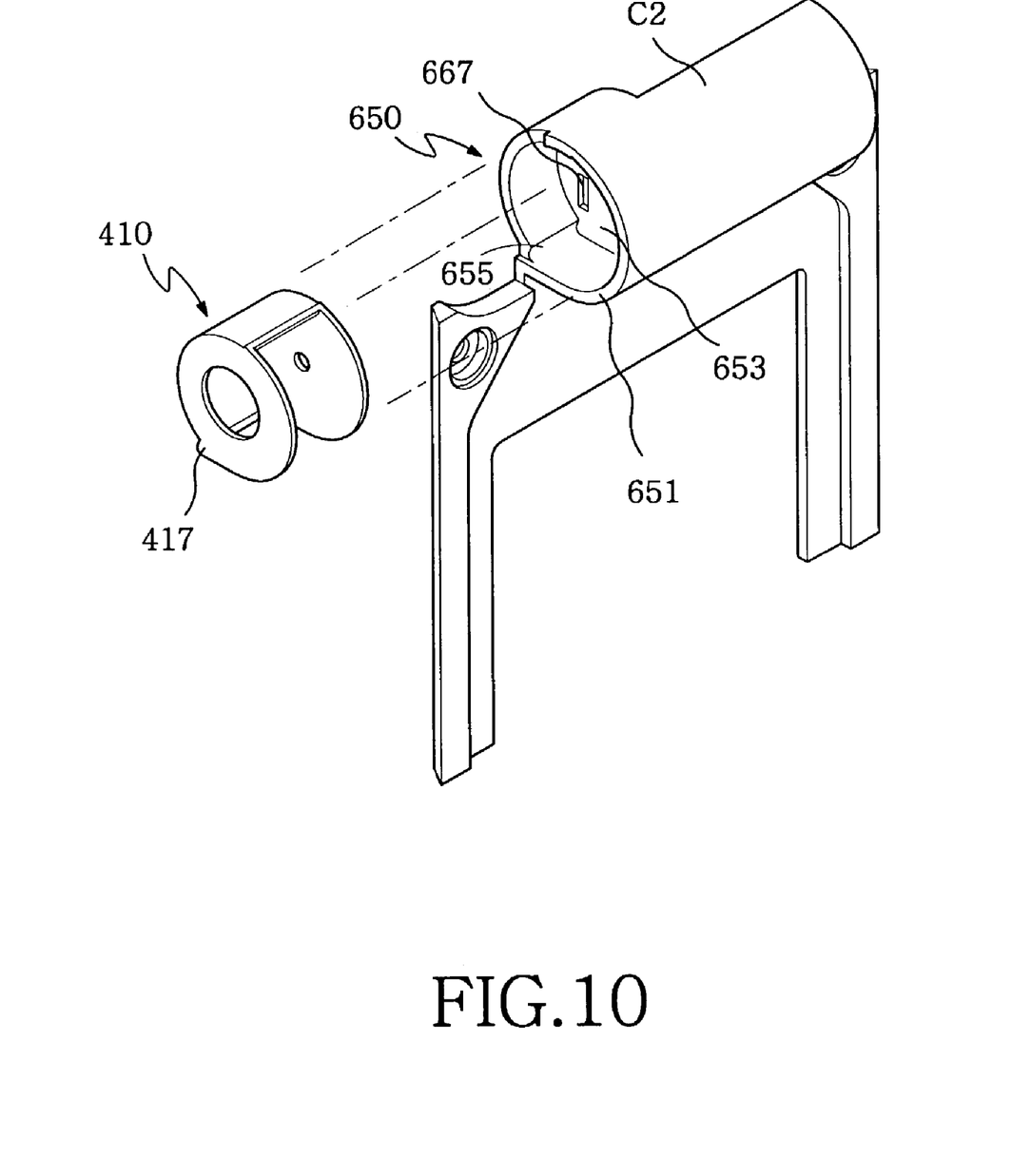
FIG. 10 is a disassembled perspective view showing the center hinge arm of the portable terminal folder of FIGS. 6–8 combined with the hinge housing of FIG. 4B.

FIG. 10 shows the center hinge arm C2 of the portable terminal folder combined with the hinge housing 410. As shown, the center hinge arm C2 has a cylindrical hinge installing block 650 to which the hinge housing 410 is coupled. The hinge installing block 650 is formed at one end of the center hinge arm C2 and is comprised of a receptacle 651 for receiving the hinge housing 410, and a rear wall 653 in which an aperture 657 is formed. The aperture 657 of the rear wall 653 obviates the need for extra equipment to insert the hinge housing 410 in the hinge installing block 650 and to separate the hinge housing therefrom. A recess 655 is formed along the receptacle 651 and extends longitudinally to the rear wall 653, corresponding to the suspending block 417 of the hinge housing 410, to facilitate the assembly of the hinge device 400 and, in conjunction with the suspending block 417, to determine the position and angle of the hinge device when combined with the portable terminal.

According to the present invention, the conical shape of the compression coil spring of the hinge device for use in a portable terminal reduces the space required for installing the spring for operating the hinge shaft, because a conical spring can be flattened into a plane under a compressive force. In addition, unlike the conventional hinge device in which, due to the need for housing the hinge cam within the hinge housing, a separate coupling means is used to connect the body to the hinge device, no such coupling means is necessary for the hinge device of the present invention, because the hinge cam is installed in the body, such that the hinge housing and the hinge cam are installed in different locations (i.e., the hinge cam in the body and the hinge housing mounted with the hinge shaft in the folder), as long as the hinge cam is affixed to the body. Thus, miniaturization of the hinge device can be accomplished because the combining means for the hinge cam and the body is no longer needed. Moreover, reducing the installation space of the hinge device enables the miniaturization of the portable terminal. On the other hand, the space reduction also allows for more space for other components to be installed in the portable terminal, particularly within the center hinge arm C2, such as a camera device 627 (see FIG. 6), which can be positioned so that the lens faces the user when the folder is closed and faces outward when the folder is closed.

While the invention has been shown and described with reference to a preferred embodiment, it will be understood by those skilled in the art that various changes in form and detail may be made without departing from the spirit and scope of the invention as defined by the appended claims.

What is claimed is:

1. A hinge device of a portable terminal, coupling a body and a folder of the portable terminal and enabling rotation of the folder with respect to the body, the hinge device comprising:
   a cylindrical hinge housing having an open end, a closed end, and a suspending block that projects from a peripheral surface of said cylindrical hinge housing and extends longitudinally between the open end and the closed end;
   a hinge shaft having a disk and an angular block projecting from the disk, the disk being housed within said cylindrical hinge housing such that the angular block protrudes through the open end of said cylindrical hinge housing;
   a hinge cam disposed outside of said cylindrical hinge housing having a concave block that slidably engages the angular block of said hinge shaft; and
   a conical compression coil spring disposed between the closed end of said cylindrical hinge housing and the disk of said hinge shaft, to press said hinge shaft against said hinge cam.

2. The hinge device as claimed in claim 1, wherein a first through hole is formed in said hinge cam at a hinge axis and a second through hole is formed in said hinge shaft at the hinge axis, the hinge device further comprising a guide pin for providing a rotation axis for said hinge cam, said guide pin having attaching means formed at a distal end, passing through the first and second through holes, and being secured at the closed end of said cylindrical hinge housing.

3. The hinge device as claimed in claim 1, wherein said cylindrical hinge housing is installed in the folder of the portable terminal and said hinge cam is installed in the body of the portable terminal.

4. The hinge device as claimed in claim 1, wherein said cylindrical hinge housing is installed in the body of the portable terminal and said hinge cam is installed in the folder of the portable terminal.

5. The hinge device as claimed in claim 1, wherein a guide groove is formed in an inner wall of said cylindrical hinge housing, extending longitudinally between the open end and the closed end of said cylindrical hinge housing, the hinge device further comprising a guide projection projecting from a peripheral surface of the disk of said hinge shaft, to enable said hinge shaft to move rectilinearly inside said cylindrical hinge housing by sliding along the guide groove.

6. A portable terminal, comprising:
   a body having a pair of symmetrically arranged side hinge arms;
   a folder having a center hinge arm disposed between the side hinge arms, the center hinge arm including a cylindrical hinge installing block; and
   a hinge device, to couple the body and the folder and enable rotation of the folder with respect to the body, the hinge device comprising:
     a cylindrical hinge housing having an open end, a closed end, and a suspending block that projects from a peripheral surface of said cylindrical hinge housing and extends longitudinally between the open end and the closed end;
     a hinge shaft having a disk and an angular block projecting from the disk, the disk being housed within said cylindrical hinge housing such that the angular block protrudes through the open end of said cylindrical hinge housing;
     a hinge cam disposed outside of said cylindrical hinge housing having a concave block that slidably engages the angular block of said hinge shaft; and
     a conical compression coil spring disposed between the closed end of said cylindrical hinge housing and the disk of said hinge shaft to press said hinge shaft against said hinge cam.

7. The portable terminal as claimed in claim 6, wherein an anchor hole is formed in one side hinge arm at a hinge axis, a first through hole is formed in said hinge cam at the hinge axis, and a second through hole is formed in said hinge shaft at the hinge axis and wherein said hinge cam is coupled to said one side hinge arm, the hinge device further comprising a guide pin for providing a rotation axis for said hinge cam, said guide pin having attaching means formed at a distal end, passing through the first and second through holes, and being secured at the closed end of said cylindrical hinge housing.

8. The portable terminal as claimed in claim 6, wherein a guide groove is formed in an inner wall of said cylindrical hinge housing, extending longitudinally between the open end and the closed end of said cylindrical hinge housing, the hinge device further comprising a guide projection projecting from a peripheral surface of the disk of said hinge shaft, to enable said hinge shaft to move rectilinearly inside said cylindrical hinge housing by sliding along the guide groove.

9. The portable terminal as claimed in claim 6, wherein a receptacle for receiving said hinge housing is provided at one end of the cylindrical hinge installing block of the center hinge arm and a rear wall having an aperture is provided at the other end of the cylindrical hinge installing block.

10. The portable terminal as claimed in claim 6, wherein a recess is formed on an inner wall of the cylindrical hinge installing block of the center hinge arm, the recess extending longitudinally and corresponding to the suspending block of said hinge housing.

* * * * *